United States Patent [19]

Häfner

[11] Patent Number: 5,353,960

[45] Date of Patent: Oct. 11, 1994

[54] GRAVIMETRIC METERING APPARATUS FOR POURABLE MATERIALS

[75] Inventor: Hans W. Häfner, Aichach-Walchshofen, Fed. Rep. of Germany

[73] Assignee: Pfister GmbH, Augsburg, Fed. Rep. of Germany

[21] Appl. No.: 734,649

[22] Filed: Jul. 23, 1991

[30] Foreign Application Priority Data

Aug. 17, 1990 [DE] Fed. Rep. of Germany ....... 4026043
Mar. 26, 1991 [EP] European Pat. Off. ......... 91104733.0

[51] Int. Cl.⁵ ............................................. G01G 13/00
[52] U.S. Cl. ...................................... 222/77; 222/370; 73/433; 177/16; 177/103; 414/219
[58] Field of Search ............. 222/77, 55, 370, 636; 73/218, 433; 177/16, 103, 59, 245; 110/101 C; 414/219

[56] References Cited

U.S. PATENT DOCUMENTS 2,614,891 10/1952 Colburn ..................... 414/219 X
4,336,851 6/1982 Iwako ........................... 177/16
4,528,848 7/1985 Häfner ....................... 222/77 X

*Primary Examiner*—Gregory L. Huson
*Attorney, Agent, or Firm*—Armstrong, Westerman Hattori, McLeland & Naughton

[57] ABSTRACT

An apparatus for continuous gravimetric metering of pourable material includes a housing having arranged therein a rotor. The material is supplied to pockets of the rotor through a charging inlet and blown out of the pockets at a discharging outlet arranged on a side of the housing opposite to a charging device. The housing is mounted at a frame and is pivotal about an axis extending through centers of elastic coupling members connecting a supply bin and a feed-away duct, respectively, to the housing. The axis may extend inclined to the horizontal. Pressurized fluid for blowing out the pockets of the rotor may be used for cleaning an interior space of the rotor prior to being applied to the pockets of the rotor.

8 Claims, 8 Drawing Sheets

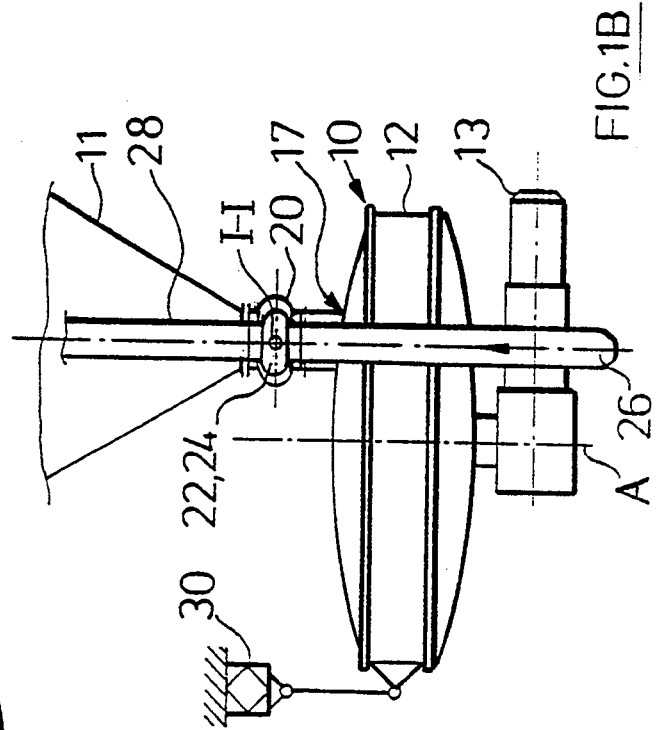
FIG.1B
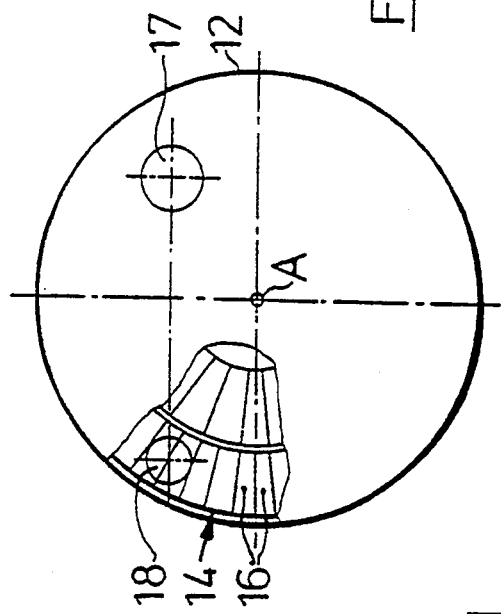
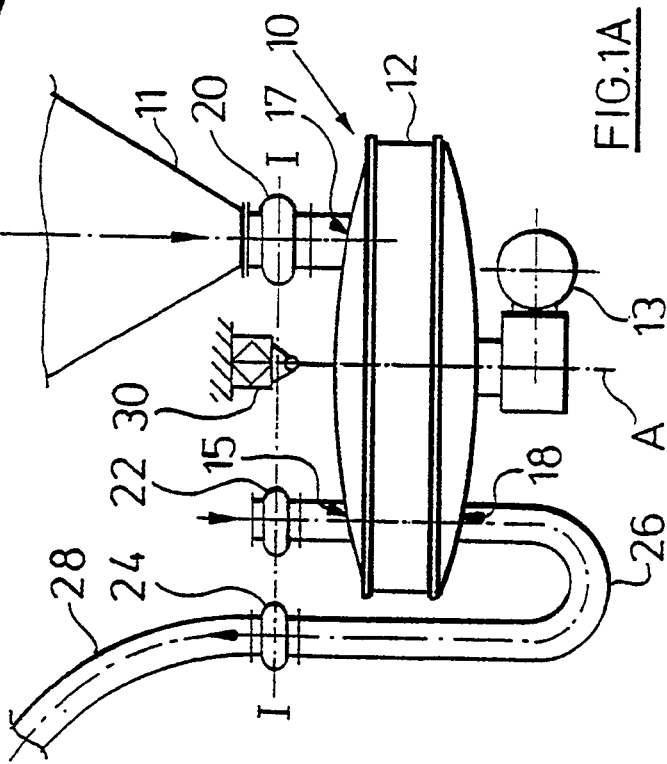
FIG.1A

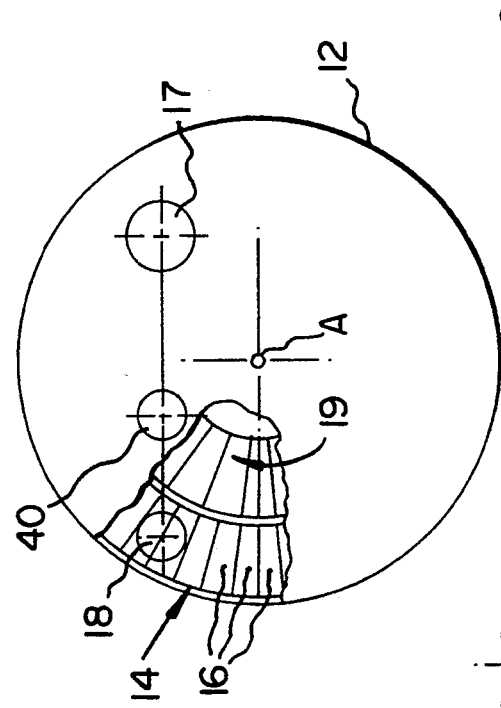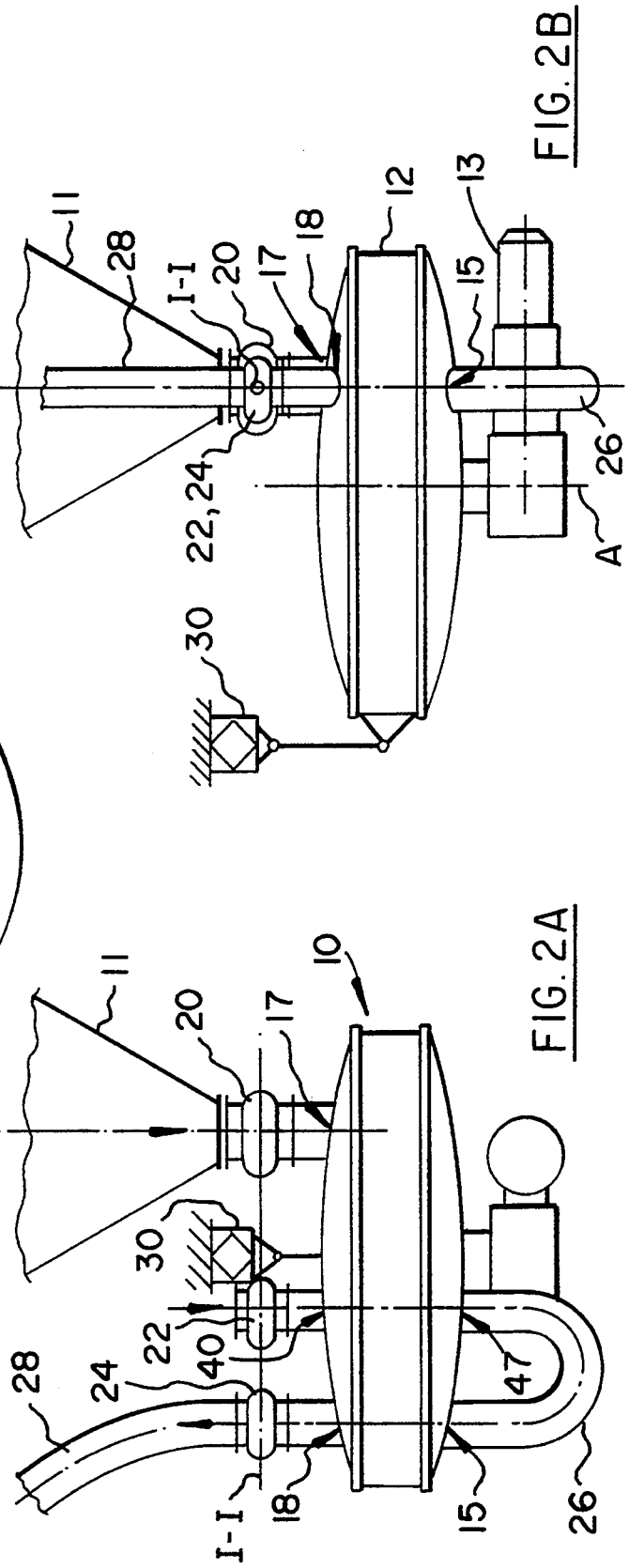

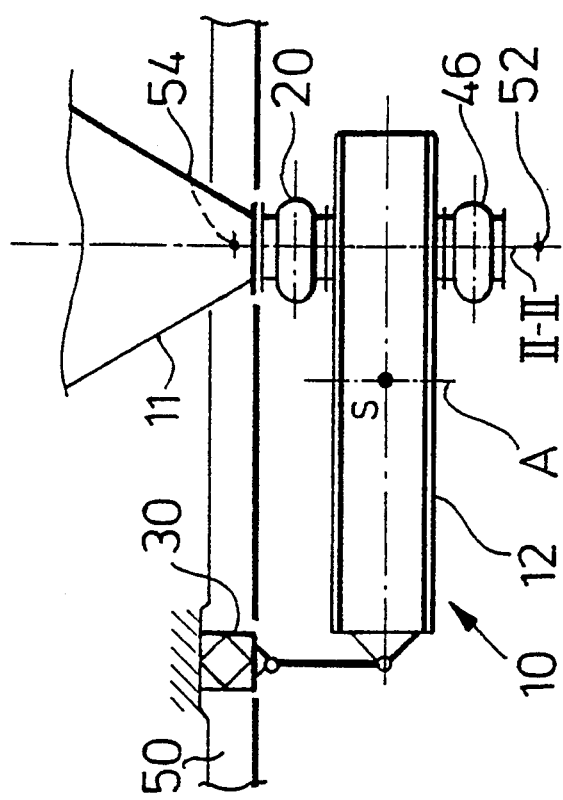
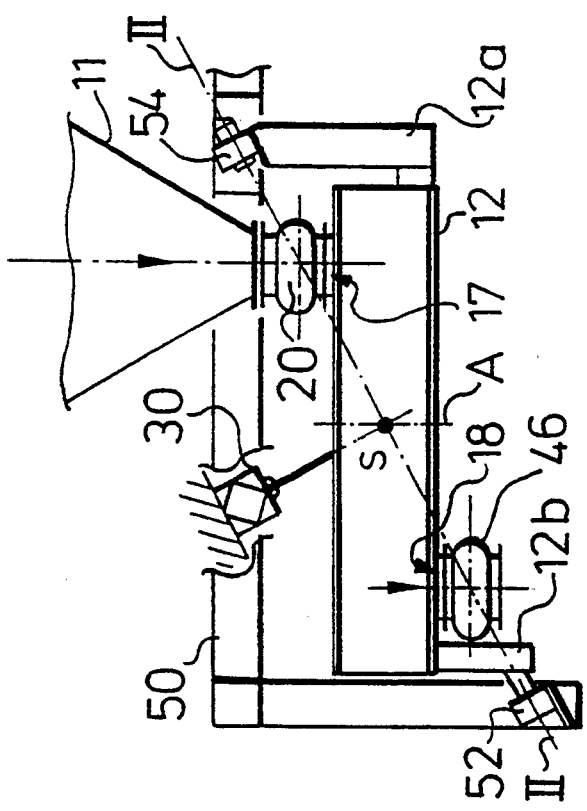

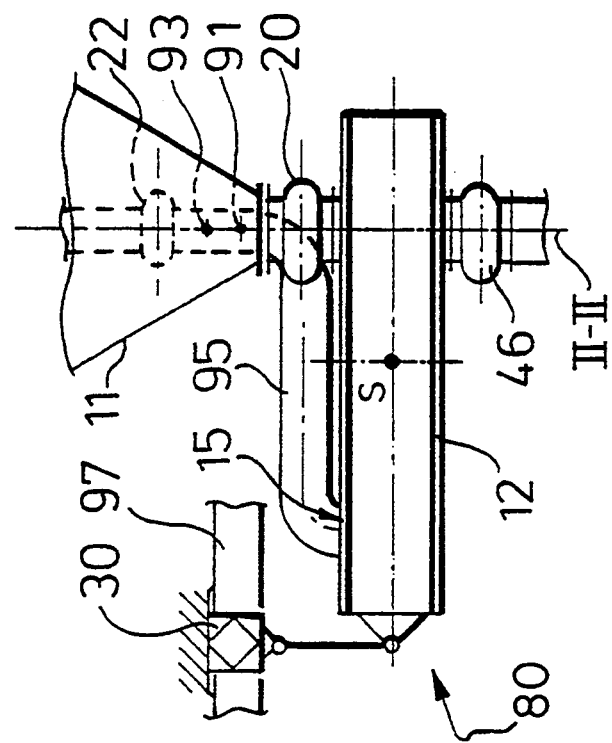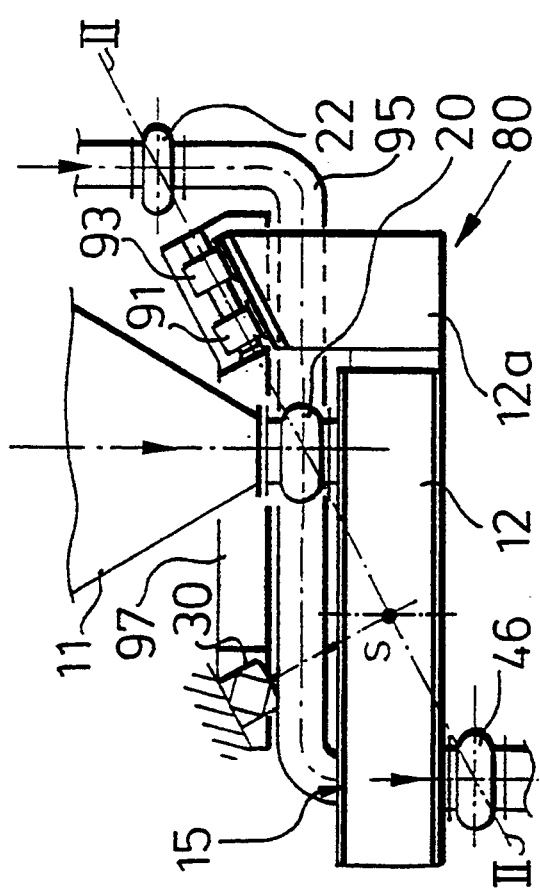
FIG. 8A
FIG. 8B

GRAVIMETRIC METERING APPARATUS FOR POURABLE MATERIALS

BACKGROUND OF THE INVENTION

The invention relates to a gravimetric metering apparatus for pourable materials such as an apparatus as disclosed in U.S. Pat. No. 4,528,848.

In this U.S. patent (hereinafter referred to as "above-mentioned patent") there is disclosed an apparatus for continuous gravimetrical metering of pourable material charged through a charging inlet into pockets of a rotor arranged in a housing and rotatable about an essentially vertical axis and discharged through a discharging outlet offset in rotating direction of the rotor in respect of the charging inlet by supplying pressurized air. The housing is pivotable about an essentially horizontal axis and is connected to a force measuring device remotely arranged from said axis. At the charging inlet and the discharging outlet an elastic connection member each is provided. The horizontal axis extends through the centers of the elastic connection members such that forces caused by twisting of the metering apparatus upon loading do not affect the measurement.

With such a metering apparatus a relatively high accuracy may be achieved. However, the arrangement of the elastic connection members as compensators in the horizontal pivotable axis, limits the variety of connections of the pneumatic feeding ducts at the discharging station, essentially to the embodiment disclosed in the above-mentioned patent, specifically in FIGS. 5 and 6.

SUMMARY OF THE INVENTION

It is an object of the present invention to provide a gravimetrically metering apparatus for pourable materials increasing the variety of connection possibilities for the pneumatic feeding system whilst maintaining high accuracy.

It is a further object of the invention to use the pressurized air supplied for conveying away the metered material for cleaning the interior of the rotor of the apparatus.

It is a still further object of the present invention to provide a gravimetric metering apparatus for pourable materials having a design enhancing easy assembly and maintenance thereof.

Metering apparatuses according to these aspects comprise the features of claim 1.

Further improvements of the apparatuses of the invention are characterized in dependent claims.

Using an inclined pivotable axis permits arranging of compensators both on the upper and lower sides of the housing and still having the pivotable axis extending through the centers of all compensators.

A one-sided support of the housing at the frame enhances access for assembly and maintenance of the apparatus.

Further features and advantages of the apparatus according to the invention may be gathered from the following description referring to the drawings.

BRIEF DESCRIPTION OF THE DRAWINGS

FIG. 1A is a schematic elevational view of a first embodiment of the apparatus of the invention;

FIG. 1B is an elevational view of the apparatus of FIG. 1A offset by 90°;

FIG. 1C is a schematic plan view of a housing of the apparatus of FIG. 1A;

FIGS. 2A-C are views similar to those of FIGS. 1A-C of a second embodiment of the apparatus of the invention;

FIGS. 3A-B are views similar to those of FIGS. 1A-B of a third embodiment of the apparatus of the invention;

FIGS. 8A-B are views similar to those of FIGS. 1A-B of an eighth embodiment of the apparatus of the invention.

DESCRIPTION OF PREFERRED EMBODIMENTS OF THE INVENTION

Figure 4B:
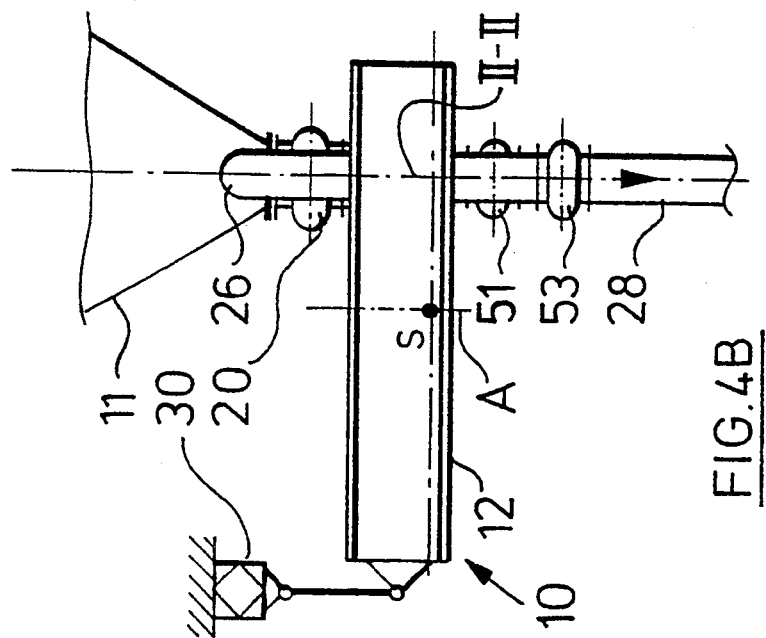
FIGS. 4A-B are views similar to those of FIGS. 1A-B of a fourth embodiment of the apparatus of the invention.

Since the design of the continuously and pneumatically operating gravimetric metering apparatus has been explained in the above-mentioned patent, full reference is made thereto and only modifications essential for the invention are explained in more detail hereinafter.

FIGS. 1A to 1C illustrate the basic design of the gravimetric metering apparatus 10. In a cylindrical region of a housing 12 a rotor 14 is arranged for rotation about an essentially vertical axis A by a motor 13, rotor 14 having pockets 16 peripherally arranged around a central inner space 19. The pockets pass below a charging station, in particular a charging inlet 17 through which material may be supplied from a bin 11. Peripherally offset to the charging inlet there is provided at a discharging station a discharging outlet 18 in the region of pockets 16 at the bottom side of housing 12 through which pourable material is blown out of pockets 16 by pressurized air supplied through an air inlet 15 into an output duct comprising an elbow pipe 26 and a feeding duct 28.

As known from the above-mentioned patent, apparatus 10 is asymmetrically suspended at a frame 50 (see FIGS. 3A and 4A) pivotable about an axis I—I. Remote from this axis I—I a force measuring device 30 is connected to apparatus 10 for determining the mass of the pourable material filled in pockets 16 between charging inlet 17 and discharging outlet 18. In view of the considerable weight of apparatus 10 high accuracy may be achieved only if the influence of any extra forces are prevented, caused by the slight pivotal movement of apparatus 10 about axis I—I. This is achieved by elastic coupling members, as compensators 20, 22, and 24, correspondingly arranged at charging inlet 17, air inlet 15 and discharging duct 26/28. According to the teaching of the above-mentioned patent, axis I—I extends approximately horizontally through the centers of the compensators 20, 22, and 24, such that upon pivotal movement of apparatus 10 twisting forces caused therein are eliminated during measurement essentially completely.

Figure 5A:
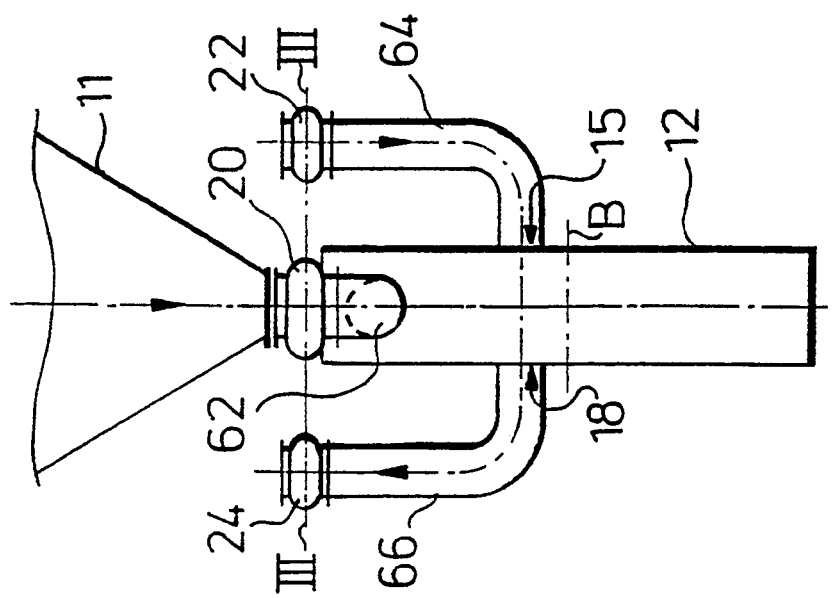
FIGS. 5A-B are views similar to those of FIGS. 1A-B of a fifth embodiment of the apparatus of the invention.
Figure 5B:
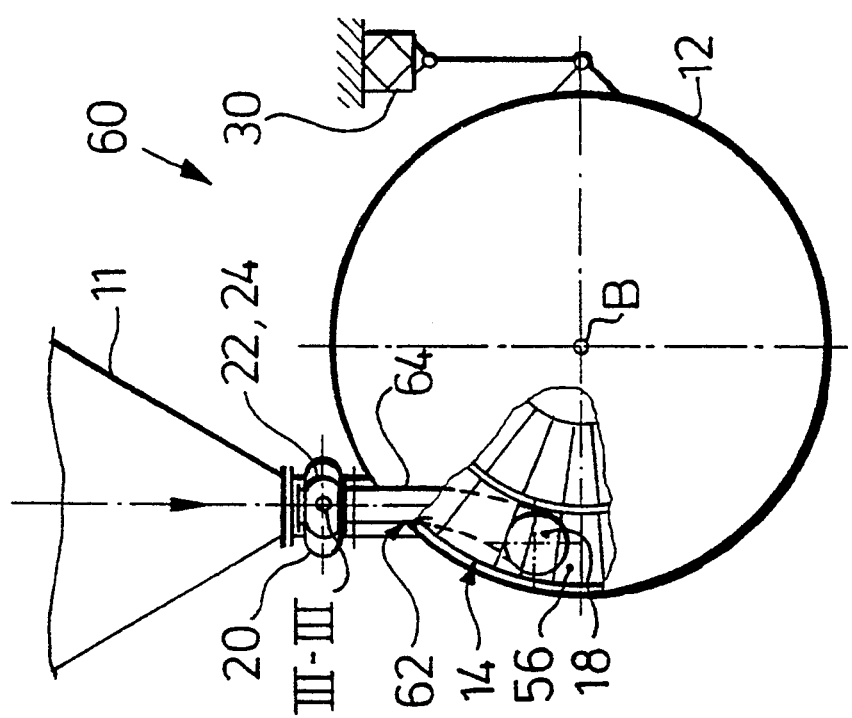

The embodiment according to FIGS. 1A to 1C differs in a characterizing manner from the known apparatus according to FIGS. 5 and 6 of the above-mentioned patent, by supplying the pressurized air from the top into housing 12 such that discharging of pockets 16 is enhanced by gravity.

FIGS. 2A to 2C illustrate a second embodiment of the invention with the characterized feature that the pressurized air is not directly introduced to apparatus 10 at the discharging station, but is guided through the open inner space 19 via an inlet 40 prior to being fed to air inlet 15 through elbow pipe 26 from an outlet 47 opposing inlet 40. Thus, inner space 19 is advantageously kept free from pourable material in view of high pressure which material otherwise has the tendency to leak inward from pockets 16 and to accumulate there.

With the third embodiment according to FIGS. 3A to 3B a specific feature of the invention is applied permitting a considerable variety of connections to the discharging station. Instead of the horizontal extension of axis I—I, with the embodiments of FIGS. 1A to 1C and FIGS. 2A to 2C pivotal axis II—II of apparatus 10 does no more extend horizontally, but at such an angle to the horizontal that this pivotal axis extends through the centers of compensators which may be arranged both above and below housing 12.

In a simple manner with the third embodiment of FIGS. 3A to 3B a compensator 46 is attached at the bottom side of housing 12 at the discharging outlet 18 such that pivotal axis II—II extending through compensator 20 passes through the center of compensator 46 as well. With this embodiment discharging just by gravity into an outlet duct (not shown) would be possible, as explained in more detail in connection with FIGS. 7A and 7B.

It should be noted that housing 12 of apparatus 10 is pivotally supported by arcuate support arms 12a, 12b at opposite ends in bearings 52, 54 mounted at frame 50 in an appropriate manner, as exemplary explained in the above-mentioned patent. A particularly advantageous one-sided support of housing 12 will be discussed hereinafter with reference to FIG. 8A.

Again FIG. 3A illustrates that apparatus 10 is suspended at a force measuring device 30, remotely from axis II—II. A force components division in view of the inclined position of axis II—II in respect of the force introduction direction of force measuring device 30 may be compensated by calibration or calculation.

As regards the angle of inclination of axis II—II in respect of the horizontal, it should be noted that this angle depends on the height of housing 12 and the horizontal distance between the axis of the charging inlet and that of the discharging outlet and will be in the range between 15° and 45°, in particular 20° to 30°.

FIG. 3A illustrates a further feature of the apparatus of the invention applicable to the majority of the explained embodiments.

In this context it should be noted that frame 50 usually is rigidly connected to bin 11 with the danger that, with a varying vertical or specifically lateral loading by bin 11, frame 50 may slightly be twisted. This may result in a slight change of position of pivotable axis II—II considerably influencing the measuring result. According to the invention such influences are prevented by locating the point of gravity S of the unit pivotable about axis II—II and comprising housing 12 with rotor 14 and motor 13 with gearing attached thereto, in a plane including axis II—II and extending in FIG. 3A normally (at an angle of 90°) to the plane of the drawing, with a normal drawn from the center of gravity onto axis II—II extending in operating position of the apparatus horizontally in that plane.

Figure 7A:
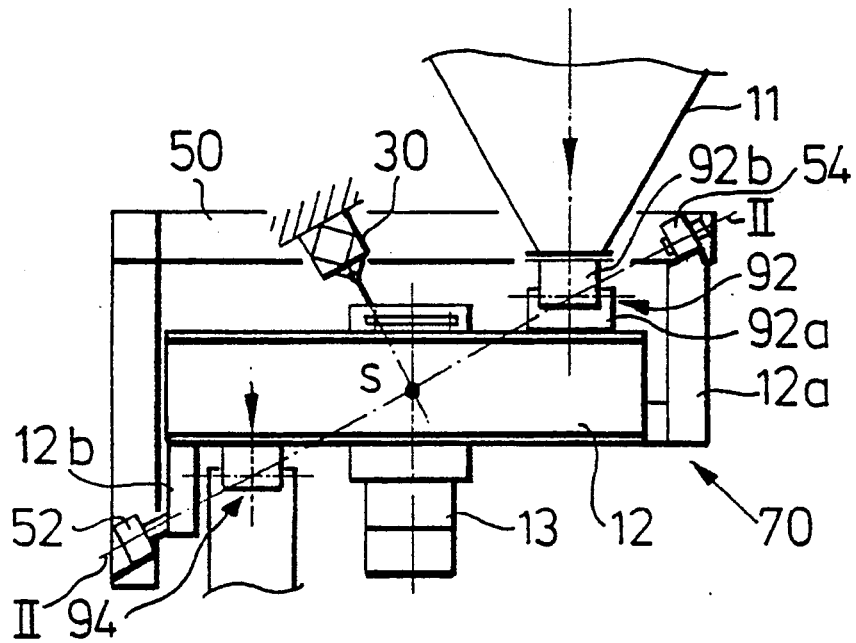
FIGS. 7A-B are views similar to those of FIGS. 1A-B of a seventh embodiment of the apparatus of the invention.
Figure 7B:
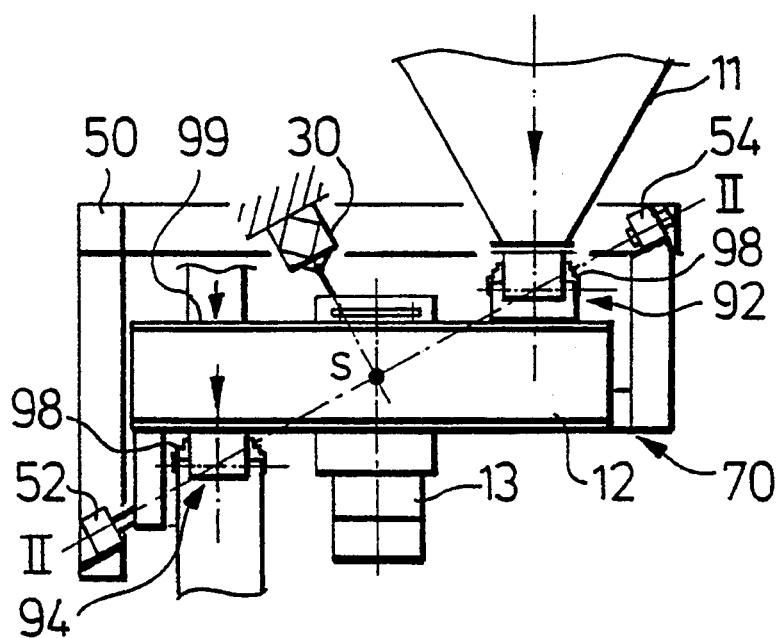

Furthermore, the force introduction direction to force measuring device 30 may be selected such that it is as normal as possible in respect of this plane (see also FIGS. 7A, 7B).

Figure 4A:
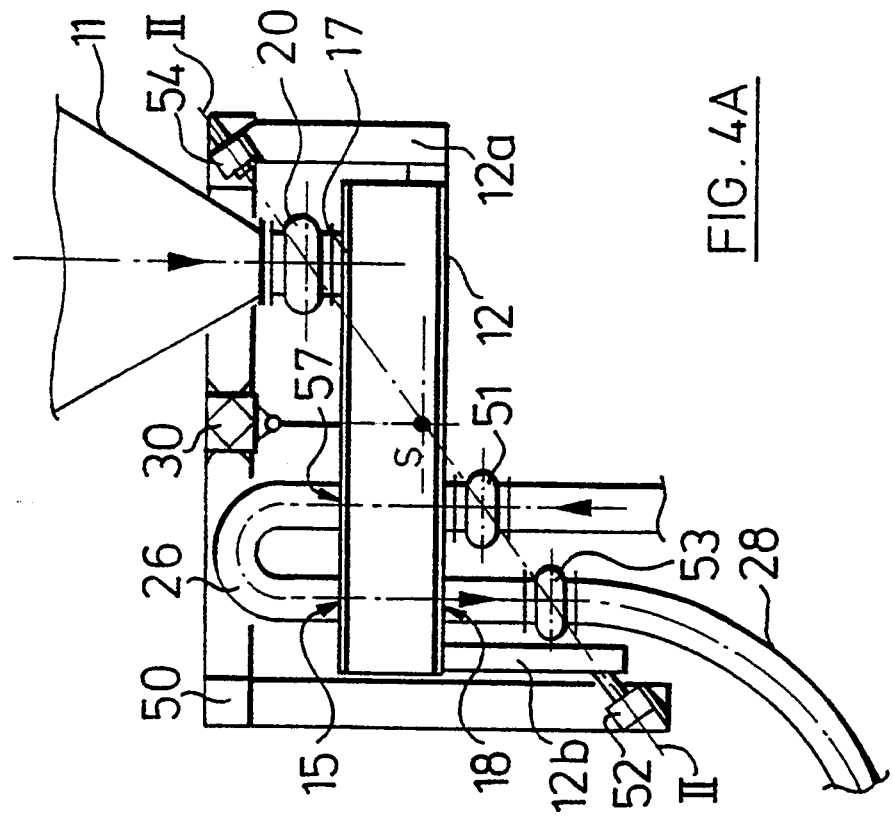

FIGS. 4A and 4B illustrate a fourth embodiment of the apparatus of the invention with the characterizing features of the preceding two embodiments being combined therein.

Specifically, the pressurized air is supplied to inner space 19 (FIG. 2C) from below via compensator 51 and to air inlet 15 via elbow pipe 26 such that pockets 16 (FIG. 2C) are blown out from the above and the pourable material is discharged through discharging outlet 18 via a compensator 53 into feed duct 28. Both compensator 20 and compensators 51 and 53 are again located on inclined pivotable axis II—II.

FIGS. 5A to 5B and 6A to 6B illustrate correspondingly two embodiments of a metering apparatus 60 of the invention, differing from the embodiment of the above-mentioned patent and the preceding embodiments by having rotor 14 of apparatus 60 rotate about an essentially horizontal axis B. A charge inlet 62 may preferably be peripherally arranged, i.e. at a peripheral wall of housing 12 with pockets 56 of rotor 14 radially open.

Discharging is again pneumatical by supplying pressurized air through compensator 22 and elbow pipe 64 to air inlet 15 with a feeding-away of pourable material blown out of pockets 56 through an elbow pipe 66 and compensator 24. With this embodiment metering apparatus 60 is suspended pivotally about an axis III—III at a frame (not shown) similar to frame 50 of FIG. 3A, axis III—III again extending through centers of compensators 20, 22, and 24. The mass of pourable material conveyed by the rotor between charging inlet 62 and discharging outlet 18 is determined by force measuring device 30 at which metering apparatus 60 is fixed remotely from axis III—III.

Figure 6A:
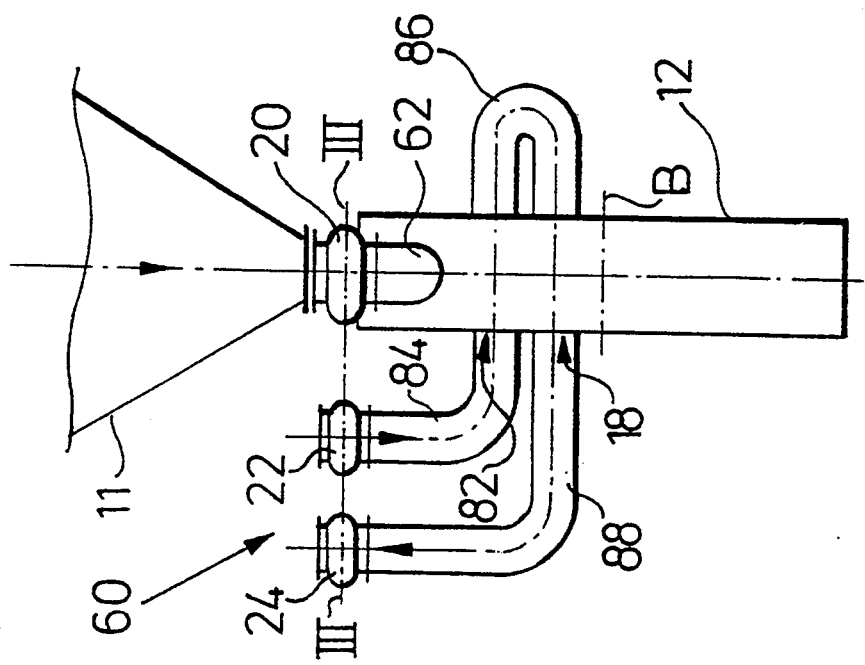
FIGS. 6A-B are views similar to those of FIGS. 1A-B of a sixth embodiment of the apparatus of the invention.
Figure 6B:
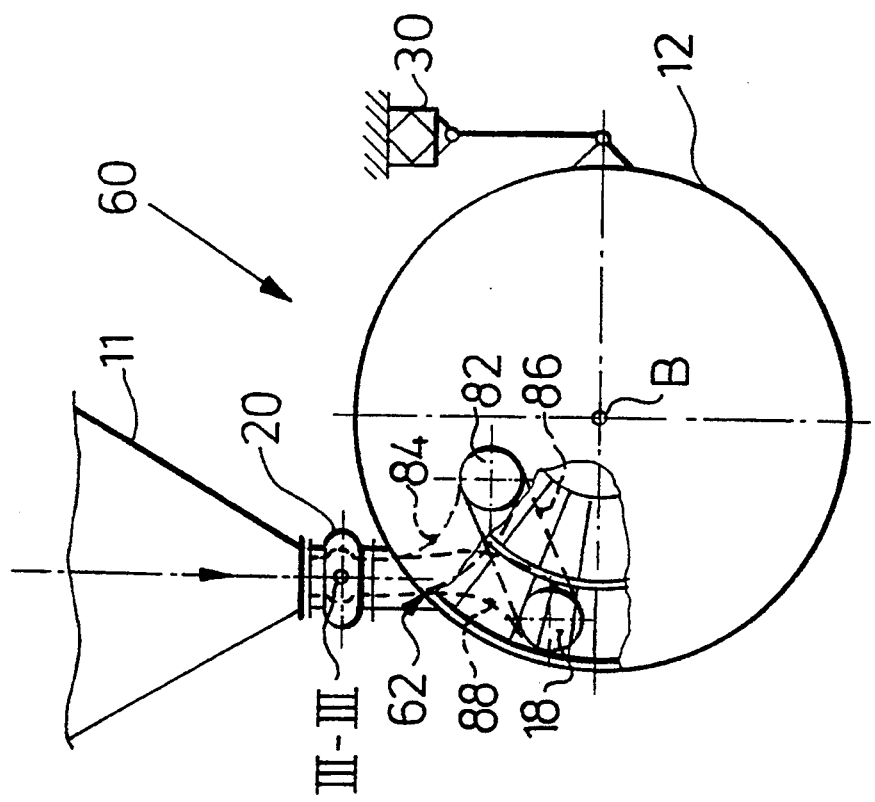

With a modification of the fifth embodiment with the sixth embodiment of the metering apparatus 60 according to FIGS. 6A to 6B blowing out of the inner space 19 of rotor 14 (FIG. 2C) is accomplished by supplying pressurized air through compensator 22 via elbow pipe 84 to a pressurized air inlet 82, an elbow pipe 86 through discharging outlet 18, an elbow pipe 88 and compensator 24. Axis III—III extends again through the centers of compensators 20, 22, and 24.

FIGS. 7A and 7B illustrate an embodiment of a gravimetric metering apparatus 70 of a seventh embodiment in a simplified version, as compared with the preceding embodiments, which apparatus may be used as a gravimetrically measuring sluice operating without pneumatic feeding. This enables use of simpler elements than elastically connected members, i.e. force-free transition elements 92, 94 which, in principle, comprise tube elements, f. i. 92a, 92b plugged together with loose.

If a certain sealing is desired, the transitions may be covered by means of flexible material 98 in form of a hose or bellow, as indicated in FIG. 7B.

Furthermore, FIG. 7B indicates that emptying of rotor 14 may be improved by supplying air, however with lower pressure through an air inlet 99.

Again, with this embodiment it is indicated in FIGS. 7A and 7B that axis II—II extends in a plane through the center of gravity of a unit comprising the elements pivotable about axis II—II in particular housing 12 and motor 13 attached thereto, with the normal drawn from the center of gravity onto axis II—II extending horizontally in said plane in operating position of the apparatus.

FIGS. 8A and 8B illustrate an eighth embodiment of a metering apparatus 80 according to the invention, where as a modification to the preceding embodiments pivotable axis II—II extends through bearings 91, 93 arranged one-sided lateral from housing 12 at frame 97, with axis II—II being connected to housing 12 preferably by a single cranked support arm 12a. Air is supplied through compensator 22, an S-type duct 95 to air inlet 15 at housing 12 with a discharging again through compensator 46. Again, pivotable axis II—II extends through the centers of compensators 20, 22, 46 and extends in a plane through center of gravity S of the unit of apparatus 80 pivotable about axis II—II, with the normal drawn from S onto axis II—II extending horizontally.

The advantage of such a one-sided support is a better access to the metering apparatus, both during assembly and maintenance.

From the preceding description it will be appreciated that there has been disclosed a gravimetric metering apparatus for pourable materials having considerable advantages as to various aspects, as compared with the known apparatus. In this connection it should be noted that the features essential for the invention are not restricted to the use with a gravimetric metering apparatus according to the above-mentioned patent, but may be applied as well for any other gravimetrically metering apparatuses, where a deterioration of the measuring result by undesired forces at connection positions of the apparatus with charging and discharging ducts are to be excluded.

I claim:

1. An apparatus for continuous gravimetric metering of pourable material comprising:
    support means;
    a housing mounted on said support means pivotally about a first axis;
    a rotor means arranged in said housing rotatably about a second axis, and having a plurality of peripherally arranged pockets;
    charging means connected to said housing for supplying said pourable material to said pockets of said rotor;
    discharging means connected to said housing opposite and offset in respect of said charging means in direction of rotation of said rotor for receiving and feeding away of said material out of said pockets;
    elastic coupling means included in said charging means and said discharging means for preventing any force transmission from said charging means and said discharging means to said housing, said first axis extending through centers of all of said elastic coupling means;
    force measuring means connected between said housing and said support means, remote from said first axis; and wherein said first axis is inclined to the horizontal.

2. The apparatus of claim 1, wherein said housing and elements attached thereto comprise a unit having a center of gravity, and wherein said first axis extends in a first plane through said center of gravity of said unit; and wherein a normal extending from said first plane and passing through said center of gravity extends in a second plane perpendicular to said second axis.

3. The apparatus of claim 1, further comprising pressurized fluid supply means connected to said housing opposite said discharging means through a further elastic coupling means, said first axis further extending through a center of said further coupling means.

4. The apparatus of claim 3, wherein said pressurized fluid supply means are connected to said housing at a region facing a central inner space of said rotor and include connecting means provided between said housing opposite said pressurized fluid supply means and said housing opposite said discharging means.

5. The apparatus of claim 4, wherein said elastic coupling means included in said discharging means and said further elastic coupling means are arranged at a side of said housing opposite to said charging means.

6. The apparatus of claim 1, wherein said second axis in operational position of said apparatus extends in an essentially vertical direction.

7. The apparatus of claim 1, wherein said second axis in operational position of said apparatus extends in an essentially horizontal direction.

8. The apparatus of claim 7, wherein said charging means is connected to said housing at a peripheral wall thereof said pockets being radially open.

* * * * *